US009333991B2

(12) United States Patent
Petelka

(10) Patent No.: US 9,333,991 B2
(45) Date of Patent: May 10, 2016

(54) SLIDING CURTAIN WALL SYSTEM

(71) Applicant: Petelka Investments Inc., Burlington (CA)

(72) Inventor: Brian Petelka, Burlington (CA)

(73) Assignee: Petelka Investments Inc., Burlington (CA)

(*) Notice: Subject to any disclaimer, the term of this patent is extended or adjusted under 35 U.S.C. 154(b) by 0 days.

(21) Appl. No.: 14/269,974

(22) Filed: May 5, 2014

(65) Prior Publication Data

US 2015/0035315 A1 Feb. 5, 2015

Related U.S. Application Data

(60) Provisional application No. 61/819,177, filed on May 3, 2013.

(51) Int. Cl.

| | |
|---|---|
| ***B60J 7/00*** | (2006.01) |
| ***B62D 33/04*** | (2006.01) |
| ***B60J 5/06*** | (2006.01) |

(52) U.S. Cl.

CPC *B62D 33/04* (2013.01); *B60J 5/065* (2013.01)

(58) Field of Classification Search

CPC .......... B62D 33/04; B62D 5/065; B60J 7/00; B60P 7/04

See application file for complete search history.

(56) References Cited

U.S. PATENT DOCUMENTS

| | | | | |
|---|---|---|---|---|
| 6,183,036 | B1 * | 2/2001 | Coulson | 296/100.13 |
| 2006/0208533 | A1 * | 9/2006 | Bowling | 296/186.2 |

FOREIGN PATENT DOCUMENTS

| | | | | |
|---|---|---|---|---|
| DE | 10056632 | A1 * | 5/2002 | B60P 7/04 |
| EP | 073404 | A2 * | 10/1996 | B60J 5/065 |

* cited by examiner

*Primary Examiner* — Lori L Lyjak

(74) *Attorney, Agent, or Firm* — Jonathan A. Kidney; TechLaw LLP

(57) ABSTRACT

The present invention provides an improved sliding curtain wall system for selectively closing an opening in a side of a covered trailer in which a plurality of elongate support members are slidably mounted to the side of the trailer to support several pieces of tarpaulin therebetween. Such a system allows the curtain wall to be easily opened and closed by sliding the support members along the length of the opening in the side of the covered trailer. Such a system also eliminates the need for straps and buckles to provide tension to the tarpaulin that forms the curtain.

5 Claims, 8 Drawing Sheets

100 6 6 140 7 7 130 120 140 110 130

SLIDING CURTAIN WALL SYSTEM

CROSS-REFERENCE TO RELATED APPLICATION(S)

This application claims the benefit of U.S. Provisional Patent Application No. 61/819,177, filed May 3, 2013, the contents of which are hereby incorporated by reference in its entirety.

FIELD OF INVENTION

The invention relates to enclosed vehicle trailers, and in particular, enclosed trailers having an open side that is selectable closable with a tarpaulin.

BACKGROUND

In the field of enclosed trailers, for example trailers for trucks having enclosed interior spaces, as opposed to flat bed trailers or trailers having side walls but open tops, several different means of opening and closing the trailer to gain access to the enclosed interior space are known. One of such means is a sliding curtain wall, in which a tarpaulin or other similar sheet of material can be selectively drawn across an opening in a side of the trailer to selectively open or close the trailer.

Currently, it is known to make such sliding curtain walls using a single tarpaulin extending across the entire opening in the side of the trailer. The single tarpaulin is drawn taught and held in a closed position using a series of straps attached to the tarpaulin, which are pulled tight and held in place using a series of overcenter buckles; the straps and buckles ensure the tarpaulin remains tensioned vertically from top to bottom at all times. Such an arrangement is disadvantageous for several reasons. By way of example, the opening and closing of the sliding curtain wall becomes labour-intensive and time consuming using such a closure arrangement. Typically, truck operators will only tension every second buckle for short trip deliveries due to laziness. This leads to buckles getting damaged or ripped off, as well as damage to the tarpaulin.

In view of the foregoing, it is clear that there is a need for an improved sliding curtain wall system, one that can be opened and closed more quickly and easily.

SUMMARY OF THE INVENTION

The present invention provides an improved sliding curtain wall system for selectively closing an opening in a side of a covered trailer in which a plurality of elongate support members are slidably mounted to the side of the trailer to support several pieces of tarpaulin therebetween. Such a system allows the curtain wall to be easily opened and closed by sliding the support members along the length of the opening in the side of the covered trailer. Such a system also eliminates the need for straps and buckles to provide tension to the tarpaulin that forms the curtain.

In one embodiment of the invention, there is provided an enclosed trailer having a selectively openable side, comprising at least one opening in at least one side thereof, a plurality of elongate support members, each of said elongate support members extending from a first end slidably attached to the enclosed trailer at a top of the at least one opening, to a second end slidably attached to the enclosed trailer at a bottom of the at least one opening, such that each of the elongate support members can slide along the length of the opening, and at least one tarpaulin mounted to at least two of the elongate support members.

DETAILED DESCRIPTION OF EMBODIMENTS

Figure 1:
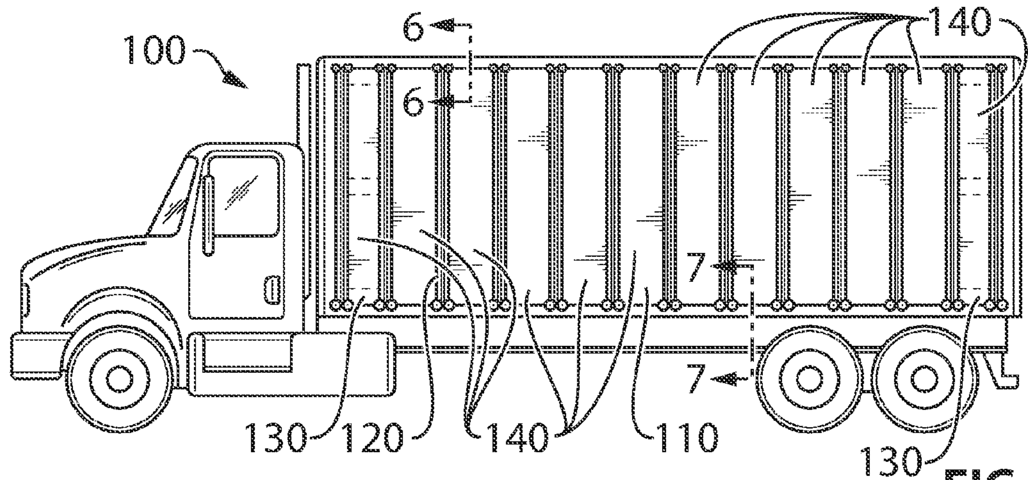
FIG. 1 is a side view of a truck and trailer having a sliding curtain wall in a closed configuration, according to the present invention.
Figure 2:
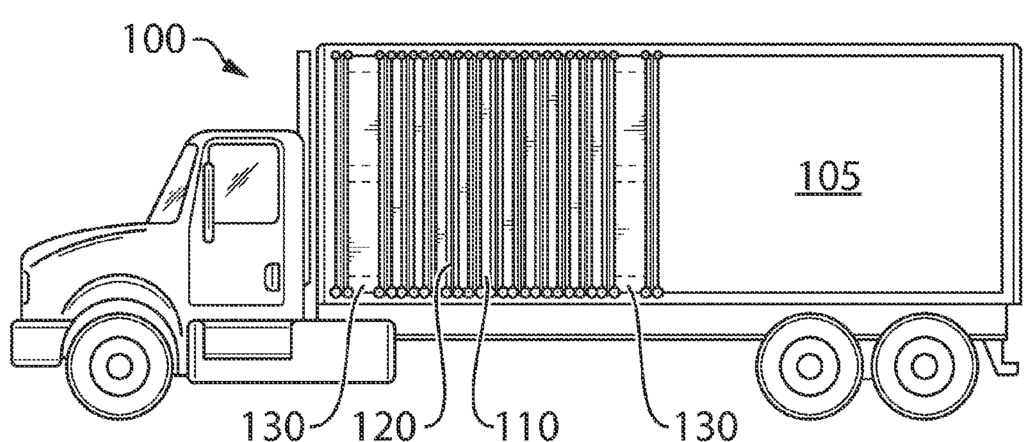
FIG. 2 is a side view of the truck and trailer of FIG. 1, with the sliding curtain wall of the present invention in a first open configuration.
Figure 3:
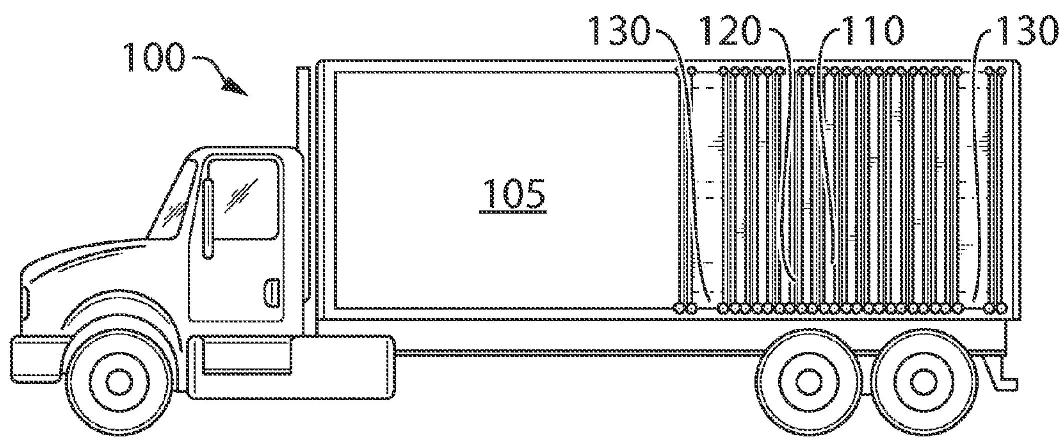
FIG. 3 is a side view of the truck and trailer of FIG. 1, with the sliding curtain wall of the present invention in a second open configuration.

The sliding curtain wall system of the present invention will now be described with reference to particular embodiments thereof, which are illustrated in the drawings. FIGS. 1, 2 and 3 illustrate a truck and enclosed trailer 100 attached thereto. The trailer 100 has an opening 105 formed along one side thereof. In the illustrated embodiment, the opening 105 comprises a completely open side; that is, the trailer 100 is simply constructed without a side panel on one of its sides. However, it will be understood that the opening 105 can be of any size desired, and can be formed by cutting away a portion of a side of the trailer 100, in addition to omitting a side panel of the trailer 100. It also will be understood that the opening 105 can be formed in any side of the trailer 100 (with the obvious exception of the bottom). It will be further understood that the trailer could have two openings, one on either side of the trailer. Such a trailer could be constructed using a front and rear wall and a roof, mounted on a flatbed trailer.

FIGS. 1, 2 and 3 also illustrate an embodiment 110 of the sliding curtain wall system of the present invention. FIG. 1 illustrates the curtain wall 110 in a 'closed' position, in which the opening 105 is closed off. FIGS. 2 and 3 illustrate the curtain wall 110 in two alternative 'open' positions in which the interior of the trailer 100 is accessible via the opening 105.

The curtain wall 110 comprises a plurality of elongate support members 120, 130 which extend across the width of the opening 105 and are slidably attached to the trailer 100, such that they may slide up and down the length of the opening 105. The elongate support members 120, 130 may be attached to the trailer 100 in any known manner suitable for allowing the support members 120, 130 to slide along the opening 105. The particular manner in which the illustrated embodiments of the support members 120, 130 are slidably attached to the trailer 100 will be described in greater detail below.

The elongate support members are arranged in a line along the length of the opening. The support members 130 at the front and back of the line are of a somewhat different design than the remainder of the support members 120. The differences between these two embodiments of the support member will be discussed in greater detail below. As will be seen, the support member 130 is wider, and has a lower centre of gravity. These properties make it less likely that the support member 130 will tip forward or backward when the support member 130 is pushed or pulled along the length of the opening 105, causing the support member 130 to jam. It will be understood, however, that identical structures can be used for all elongate support members of the sliding curtain wall 110, if desired.

The curtain wall 110 further comprises a plurality of tarpaulin segments 140. Each of the tarpaulin segments 140 is affixed at one end to one of the elongate support members 120 (or 130, as the case may be) and is affixed at an opposing end to another of the elongate support members 120 or 130). The tarpaulin segments 140 can be attached to the support members 120 (or 130) in any suitable manner. For example, the tarpaulin segments 140 can be attached to the support members 120 (or 130) in any suitable manner. An example attachment is described in detail below. Each tarpaulin segment 140 covers substantially all of the space between the support members 120 (or 130) to which it is attached.

Alternatively, a single tarpaulin can be used that extends across substantially all of the opening 105 in the trailer 100, and is attached to all of the support members 120, 130. Such attachment can be achieved by any suitable means, for example, by using VELCRO™ hook and loop fastener straps that wrap around the support members 120, 130.

In operation, when the sliding curtain wall 110 is closed, the elongate support members 120 and 130 are approximately evenly distributed along the length of the opening 105. The support member 130 at the front of the line of support members (hereinafter, the "front support member") is directly adjacent the forward edge of the opening 105, and the support member 130 at the back of the line of support members (hereinafter, the "rear support member") is directly adjacent the rearward edge of the opening 105. In this configuration (shown in FIG. 1), the tarpaulin segments 140 extend across substantially all of the opening 105, thus closing the opening 105.

To open the trailer 100, the rear support member 130 can be slid forward toward the forward edge of the opening 105. In so doing, the tarpaulin segment 140 between the rear support member 130 and the adjacent support member 120 folds into a compressed state, the rear support member 130 contacts the adjacent support member 120 and both the rear support member 130 and the adjacent support member 120 continue to move forward toward the forward edge of the opening 105. This process continues until all of the tarpaulin segments 140 are folded into compressed states, and all of the support members 120 and 130 are arranged side-by-side at the front of the opening 105, as shown in FIG. 2. In this configuration, a substantial portion of the opening 105 is open, and the interior of the trailer 100 is accessible.

Alternatively, the trailer 100 can be opened by sliding the front support member 130 rearward toward the rearward edge of the opening 105. In so doing, essentially the same process as is described above occurs in reverse, resulting in the configuration shown in FIG. 3. In this configuration, a substantial portion of the opening 105 is open, and the interior of the trailer 100 is accessible.

Figure 4:
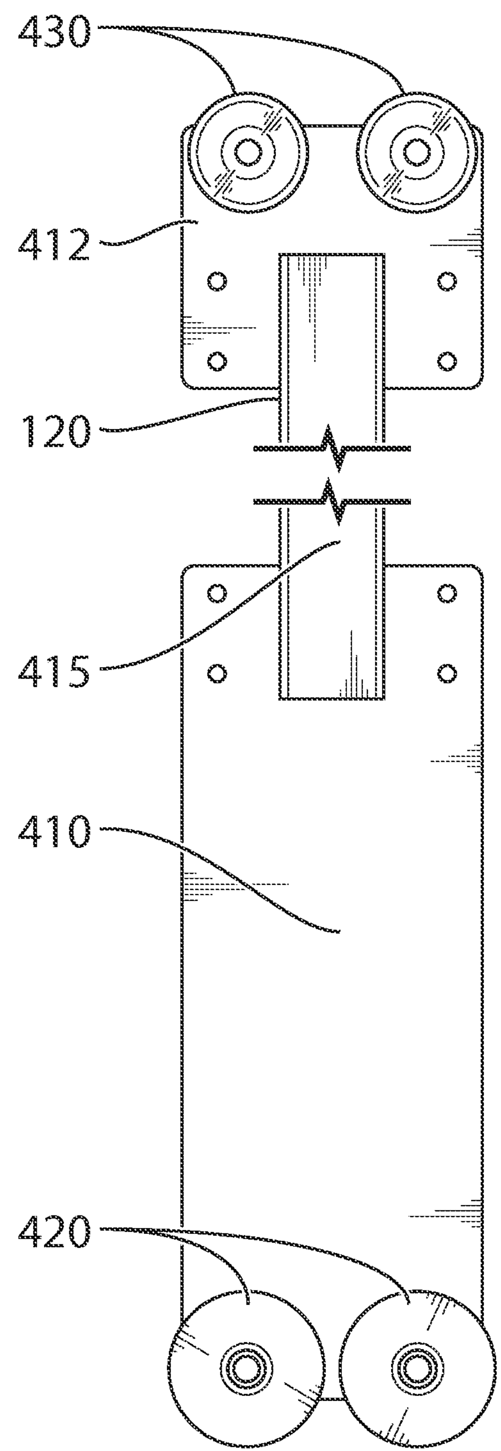
FIG. 4 is a front view of a first embodiment of an elongate support member of the sliding curtain wall of the present invention.

FIG. 4 illustrates an embodiment of the support member 120. The support member 120 has a lower plate 410, an upper plate 412, and a support beam 415 extending from the lower plate 410 to the upper plate 412. The components of the support member 120 (i.e., the lower plate 410, the upper plate 412 and the support beam 415) can be made from any material suitable for use to make structural components of a trailer; by way of example, stainless steel or aluminum can be used. By way of example, the lower plate 410 and upper plate 412 can be 4" square. The lower plate 410 and upper plate 412 can be made larger than this, as illustrated in FIG. 4; however, if they are made smaller, they may be prone to tipping forward or backward when being slid along the length of the opening 105, thus causing the system to jam. The support beam 415 can have a cross-section of 2" by 1.625", and can have any height suitable to allow the support member 120 to extend across the height of the opening 105. The support member 120 also comprises two lower rollers 420 and two upper rollers 430, rotatably attached to the lower plate 410 and upper plate 412, respectively.

Figure 5:
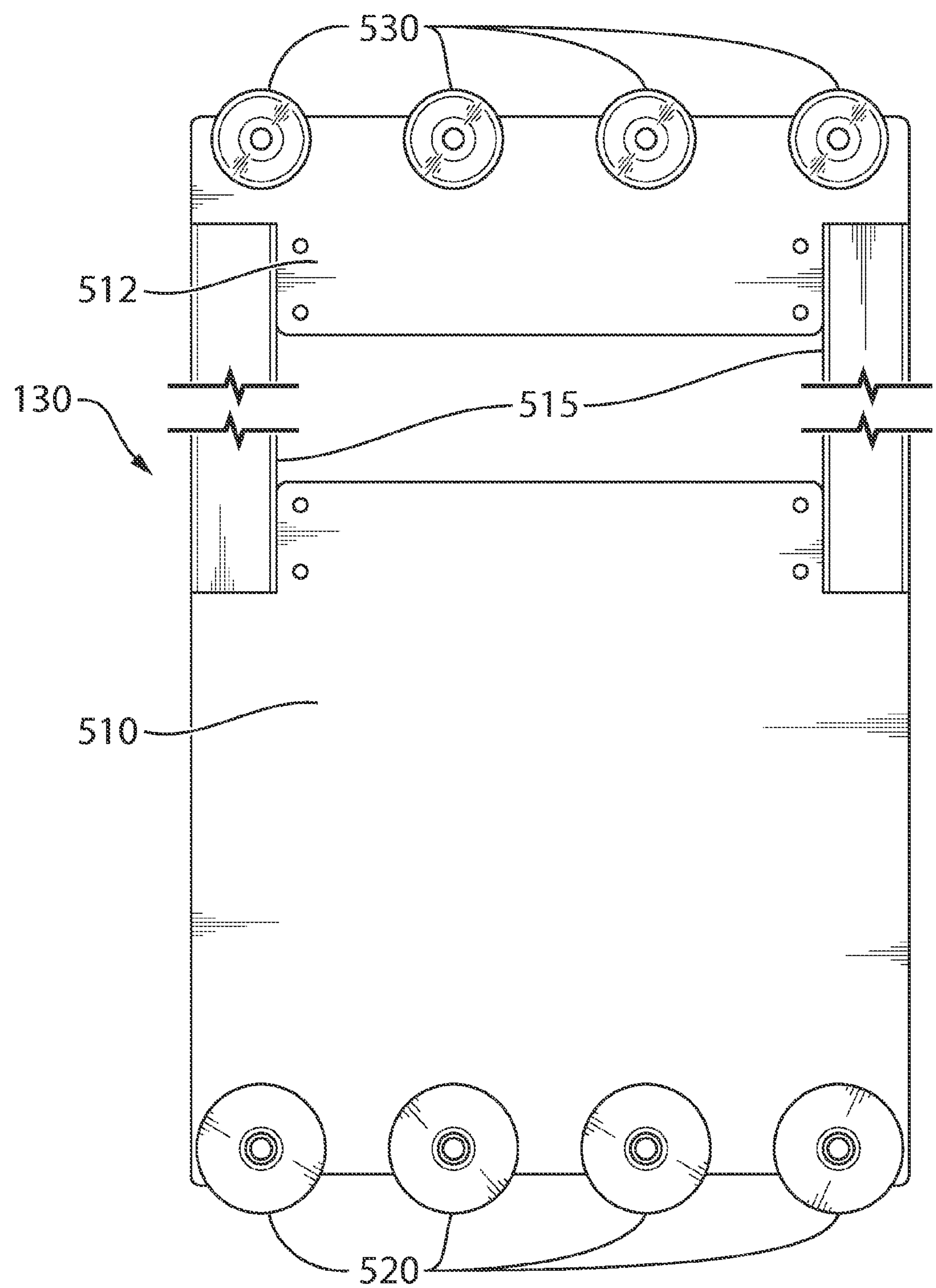
FIG. 5 is a front view of a second embodiment of an elongate support member of the sliding curtain wall of the present invention.

FIG. 5 illustrates an embodiment of the support member 130 that can be used as the front support member or the rear support member. The support member 130 has a lower plate 510, an upper plate 512, and two support beams 515 extending from the lower plate 510 to the upper plate 512. As can be seen in FIG. 5, the lower plate 510 and upper plate 512 are wider than the lower plate 410 and upper plate 412 used in respect of the support member 120, and the support beams 515 extend from the lower plate 510 to the upper plate 512 at either end of said plates. These features make the support member 130 more resistant to tipping forward or backward when being pushed forward or backward during operation of the curtain wall 110. Thus, the support member 130 is less prone to jamming during use. By way of example, the components of the support member 130 (i.e., the lower plate 510, the upper plate 512 and the support beam 515) can be made from any material from which the support member 120 can be made. The lower plate 510 and upper plate 512 can be 12" square. The lower plate 510 and upper plate 512 can be wider as well, to make the support member 130 even less prone to jamming during operation. The lower plate 510 and upper plate 512 also can be taller, to accommodate any special needs of the cargo that may exist. The support beams 515 can have the same dimensions as those of the support beams 415. The support member 130 also comprises four lower rollers 520 and four upper rollers 530, rotatably attached to the lower plate 510 and the upper plate 512, respectively.

Figure 4A:
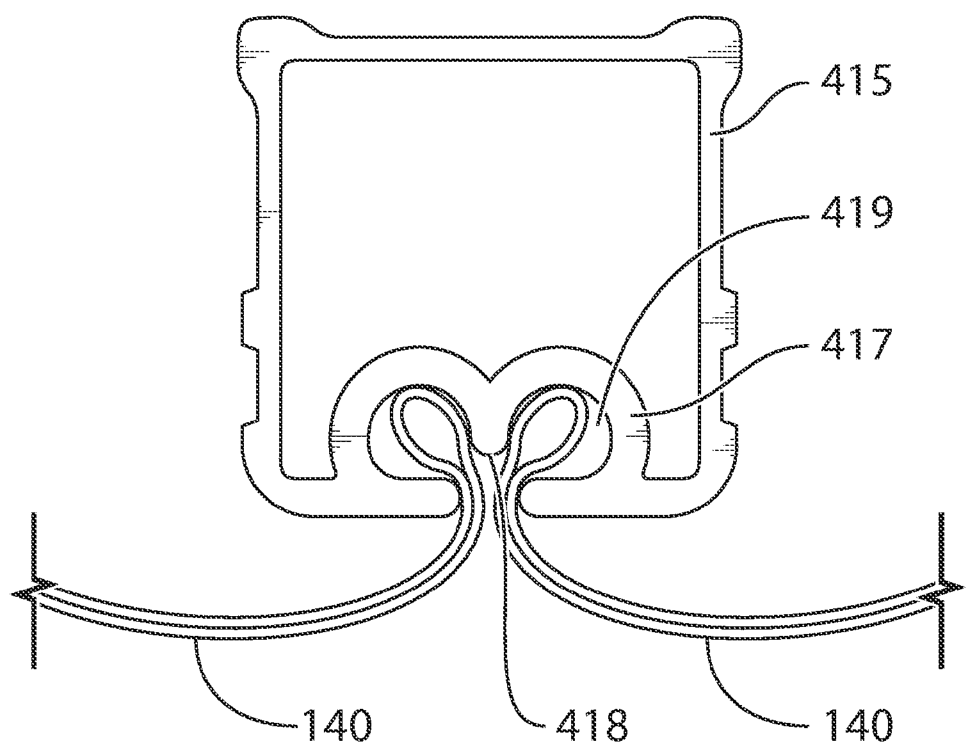
FIG. 4A is a top view of the embodiment of the elongate support member of FIG. 4.

The tarpaulin segments 140 can be attached to the support members 120 as shown in FIG. 4A. In particular, the support beam 415 can be formed with barrels 417 on the inwardly-facing surface thereof, each of which forms a receiving space 419 therein. The ends of the tarpaulin segments 140 can be inserted in the receiving space 419 by way of opening 418.

On either the front support member 130 or the rear support member 130, a sliding tarp connector (not shown) can be provided to allow the horizontal curtain tension to be adjusted across the entire opening 105. The sliding tarp connector comprises a vertical plate attached to either the front support member 130 or the rear support member 130, with a horizontal slot which allows the end tarpaulin segment 140 to be attached. The tension of the end tarpaulin segment 140 can be adjusted by tilting top or bottom.

Figure 6:
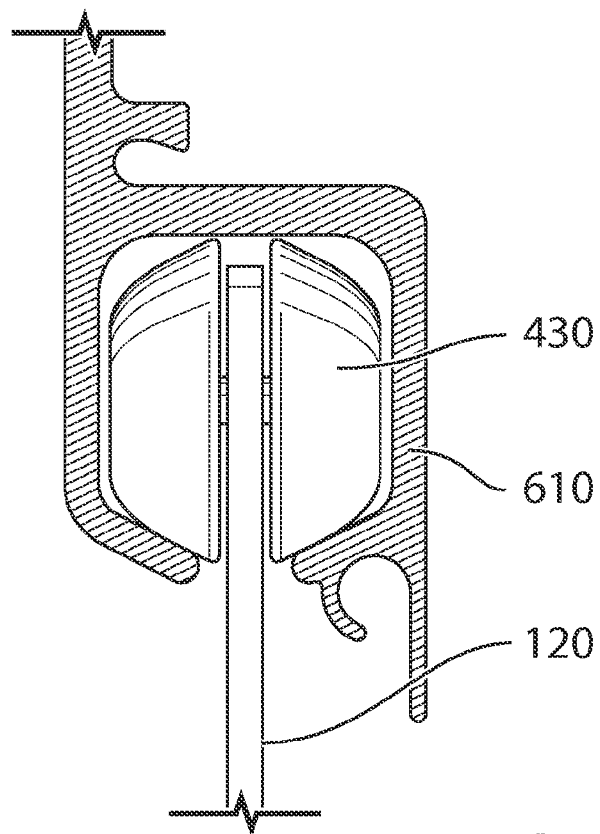
FIG. 6 is a sectional view taken along line 6-6 of FIG. 1.
Figure 7:
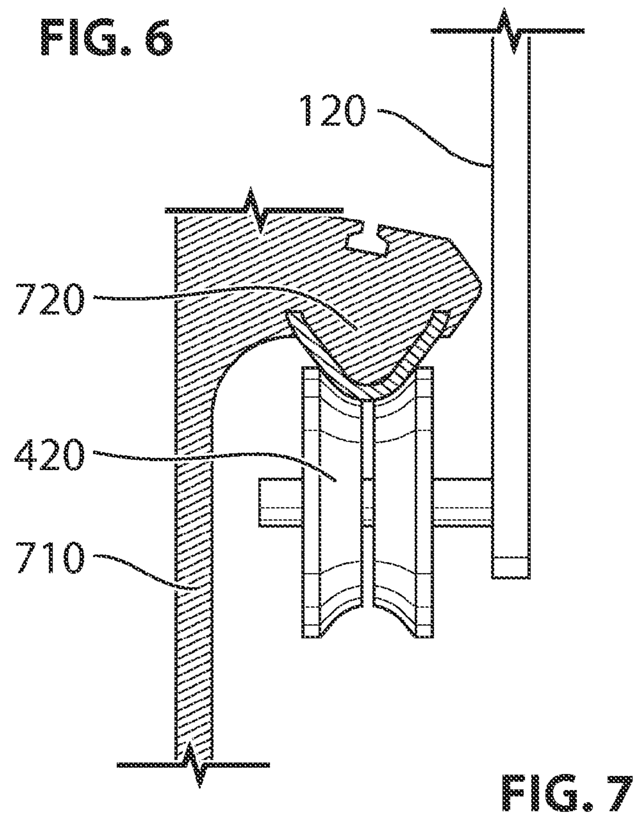
FIG. 7 is a sectional view taken along line 7-7 of FIG. 1.

The manner in which the support members 120 and 130 are slidably attached to the trailer 100 will now be described, with reference to FIG. 6 and FIG. 7. The support members 120 and 130 are attached to the trailer 100 at the lower rollers 420, 520 and the upper rollers 430, 530. The lower rollers 420, 520 and the upper rollers 430, 530 can be of any round shape that allows for the support members 120, 130 to roll. In particular, the upper rollers 430, 530 can comprise tapered wheels, as shown in FIG. 6, which can glide with less friction. As well, the lower rollers 420, 520 can be of a disk-like shape having a groove in the outer surface thereof, similar to that of a sheave, to facilitate slidable attachment of the support members 120, 130 to the trailer 100. A groove of this nature can be seen in FIG. 7.

The upper rollers 430, 530 are received in an upper track 610, which can be affixed to the trailer 100 above the opening 105 in any manner suitable to support the combined weight of each of the support members 120, 130 and the tarpaulin segments 140. The upper track 610 is an elongate, "U"-shaped bracket. The upper track 610 receives the upper rollers 430, 530 in an interior space defined thereby, and allows the upper rollers 430, 530 to roll within the interior space, along the length of the upper bracket 610. The "U"-shaped cross section of the upper track 610 helps to prevent the build up of road debris in the track, which improves the operability of the curtain wall 110.

The lower rollers 420, 520 are received in a lower track 710, which can be affixed to the trailer 100 below the opening 105 in any manner suitable to support the weight of the lower track 710. Similar to the upper track 610, the lower track 710 is an elongate, "C"-shaped bracket. The lower track 710 receives the lower rollers 420, 520 in an interior space defined thereby, and allows the lower rollers 420, 520 to roll within the interior space, along the length of the lower bracket 710.

In some embodiments, the lower track 710 can have a ridge 720 projecting downwardly from an upper portion of the lower track 710, and having a shape complimentary to the groove provided in the lower rollers 420, 520. In such embodiments, the length of the support beams 415, 515 can be selected such that, when the upper rollers 430, 530 are received in the upper track 610, the lower rollers 420, 520 are held in place against the upper portion of the lower track 710, with the groove of the lower rollers 420, 520 engaging the ridge 720. In such a configuration, the lower rollers 420, 520 are held securely in the lower track 710, and can resist forces that tend to pull the support members 120, 130 out and away from the trailer 100.

Figure 8:
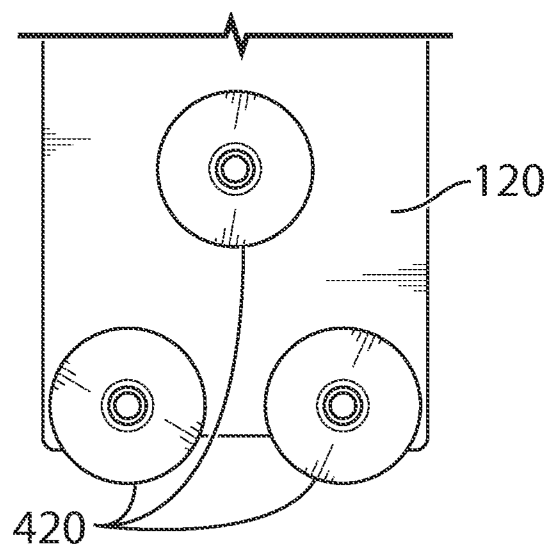
FIG. 8 is a front view of a portion of a third embodiment of an elongate support member of the sliding curtain wall of the present invention.
Figure 9:
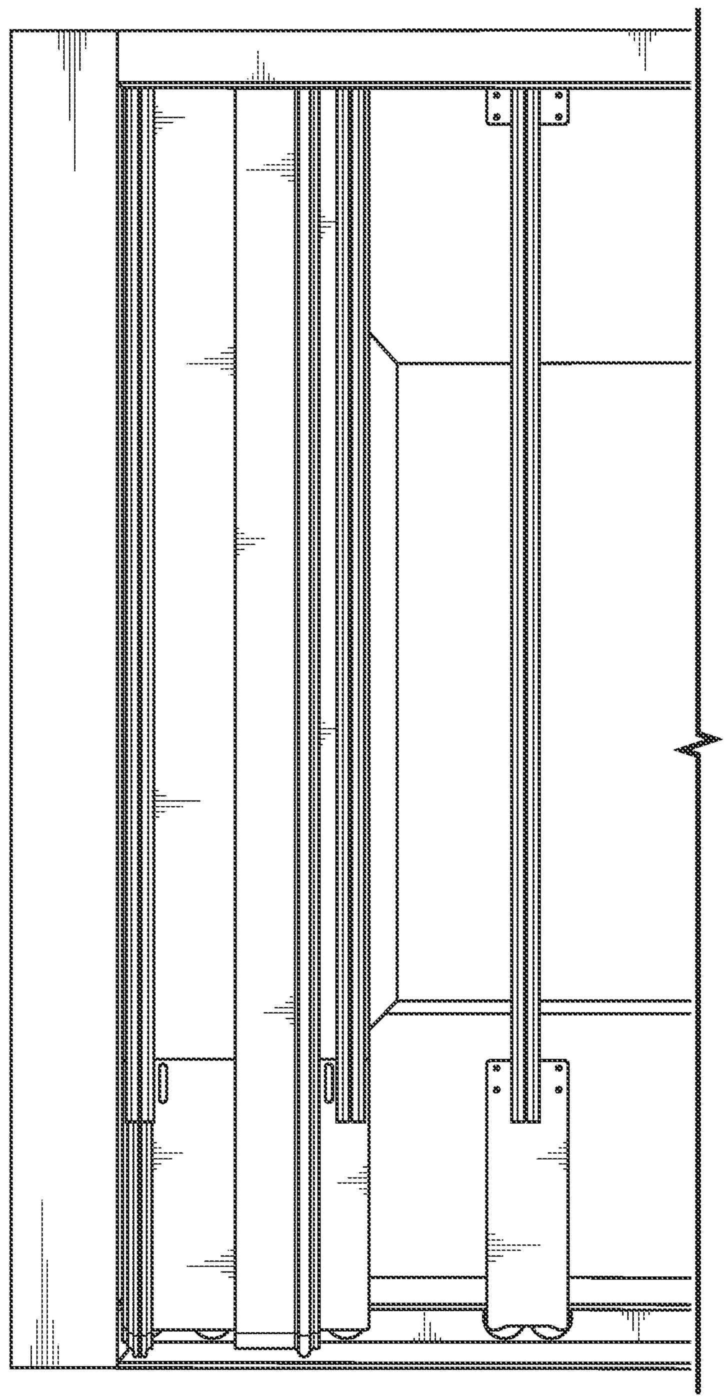
FIG. 9 is a perspective view of an embodiment of the invention showing an adjustable tarp tensioning plate.
Figure 9A:
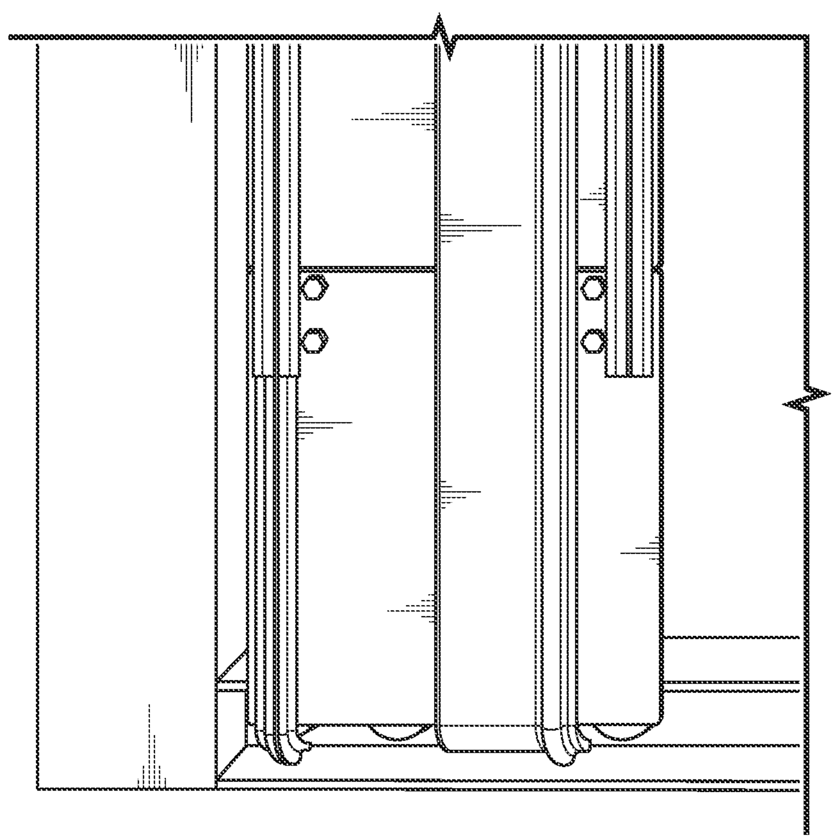
FIG. 9A is a perspective view of the adjustable tarp tensioning plate.

Referring to FIG. 8, an alternative embodiment of a support member 120 is shown, in which a third lower roller 420 is provided. The additional lower roller 420 is provided above the other two lower rollers 420, and is intended to engage and slide along the top surface of the lower track 610. In such embodiments, the lower track 610 can be provided with a second ridge (not shown) extending upwardly from the top of the lower track 610, for engaging the groove of the third lower roller 420. Using this configuration, the support member 120 is even more securely attached to the trailer 100.

It will be apparent to those having ordinary skill in the art that certain adaptations and modifications of the described embodiments can be made, consistent with and without departing from the present invention. Unless otherwise indicated, the embodiments described in the invention shall be understood to be non-exclusive of each other such that any embodiment can include different features of other embodiments. Therefore, the above discussed embodiments are considered to be illustrative and not restrictive. Other embodiments consistent with the present invention will become apparent from consideration of the specification and the practice of the present invention taught and suggested herein. Accordingly, the specification and the embodiments disclosed therein are to be considered exemplary only, with the true scope of the present invention being identified in the following claims.

The invention claimed is:

1. An enclosed trailer having a selectively openable side, comprising:

at least one opening in at least one side of said trailer;

a plurality of elongate support members, each of said elongate support members extending from a first end slidably attached to the enclosed trailer at a top of the at least one opening, to a second end slidably attached to the enclosed trailer at a bottom of the at least one opening, such that each of the elongate support members can slide along a length of the opening; and a plurality of tarpaulin segments, each of said plurality of tarpaulin segments mounted to two adjacent ones of the elongate support members to selectively cover said at least one opening.

2. The enclosed trailer of claim 1, wherein:

the enclosed trailer has a track extending along a lower edge of the at least one opening;

the plurality of elongate support members each comprise at least one roller rotatably mounted to the second end; and the at least one roller of each of the plurality of elongate support members is received in the track such that the second end of each of the plurality of elongate support members can slide along the track.

3. The enclosed trailer side of claim 2, wherein:

the at least one roller of each of the plurality of elongate support members comprises a disk-shaped wheel having a groove formed in a circumferential edge thereof;

the track comprises a "C"-shaped track defining an interior space, and a ridge extending downwardly from an inner top surface of the track into the interior space, the ridge having a cross-section complimentary to that of the groove; and the ridge engages the groove when the at least one roller of each of the plurality of elongate support members is received in the track.

4. The enclosed trailer of any one of claim 2 or 3, wherein each of the plurality of elongate support members further comprises a second roller rotatably mounted to the second end, such that the second roller engages an outer top surface of the track and can slide along the track.

5. The enclosed trailer of claim 4, wherein the second rollers each comprise a disk-shaped wheel having a groove formed in a circumferential edge thereof, the track comprises a "C"-shaped track defining an interior space, the track having a ridge extending upwardly from the outer top surface, the ridge having a cross-section complimentary to that of the groove, and the ridge engages the groove when each of the second rollers engage the outer top surface of the track.

* * * * *